United States Patent [19]

Scheib

[11] 4,036,506
[45] July 19, 1977

[54] TILTABLE SLED

[76] Inventor: Rudi Scheib, Gartenstrasse 11, 7015 Korntal, Germany

[21] Appl. No.: 695,285

[22] Filed: June 11, 1976

[30] Foreign Application Priority Data

June 12, 1975 Germany .............................. 2526169
Feb. 26, 1976 Germany .............................. 2607748

[51] Int. Cl.² ........................................... B62M 27/02
[52] U.S. Cl. .................................................. 280/21 A
[58] Field of Search ........................... 280/21 R, 21 A

[56] References Cited

U.S. PATENT DOCUMENTS 3,140,099  7/1964  Feu ...................................... 280/21 A
3,361,436  1/1968  Williams ............................. 280/21 A
3,583,507  6/1971  Trautwein .......................... 280/21 A
3,827,516  8/1974  Lucia ................................... 280/21 A

FOREIGN PATENT DOCUMENTS 64,503  4/1914  Austria ............................. 280/21 A Primary Examiner—Robert R. Song
Attorney, Agent, or Firm—J. Rodman Steele, Jr.

[57] ABSTRACT

A sled on which two movable runners in front and two in back are mounted so that they can be tilted on a sled frame, so that the canting axes, running in the direction of travel, are primarily parallel over the sled's contact surface and the runners are connected with each other by at least one jointed parallelogram which transfers the tilting motion.

24 Claims, 17 Drawing Figures

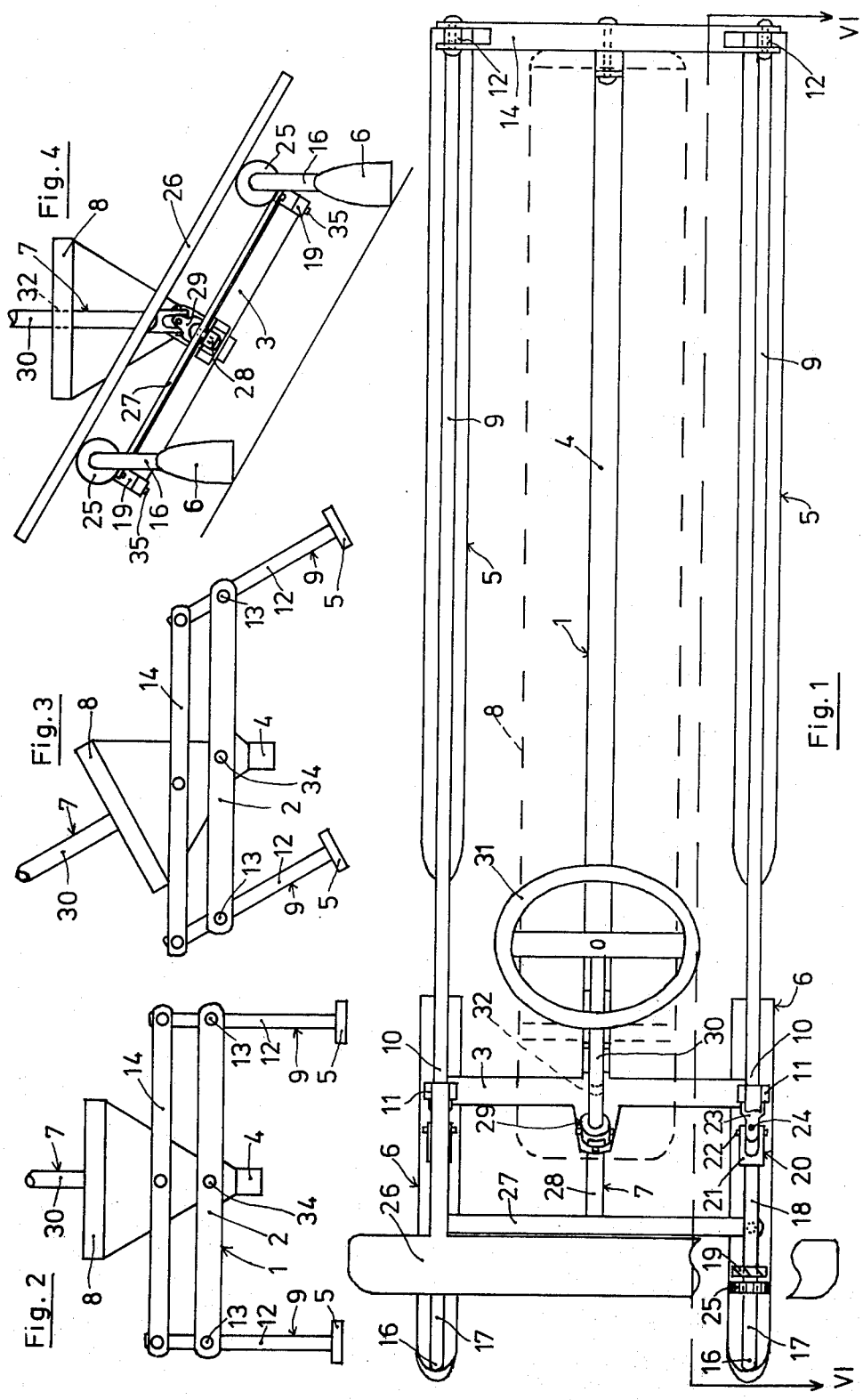

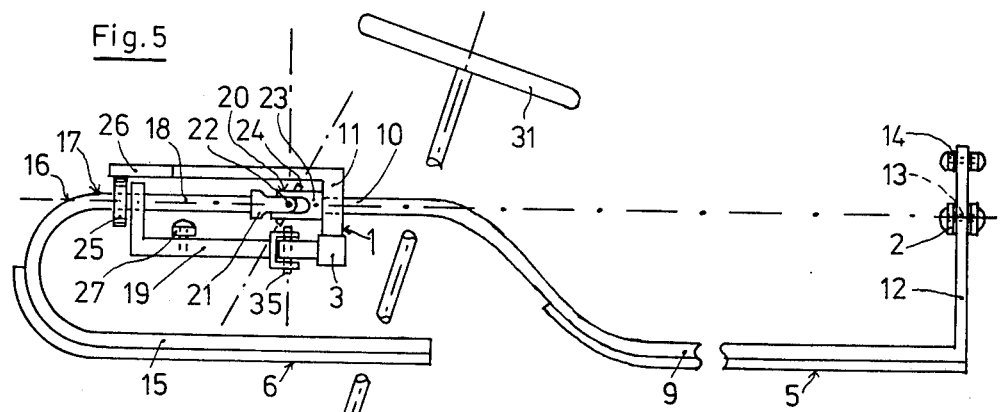
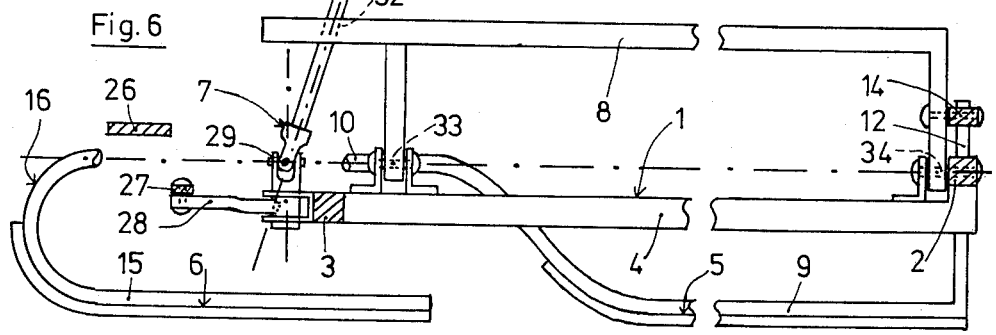
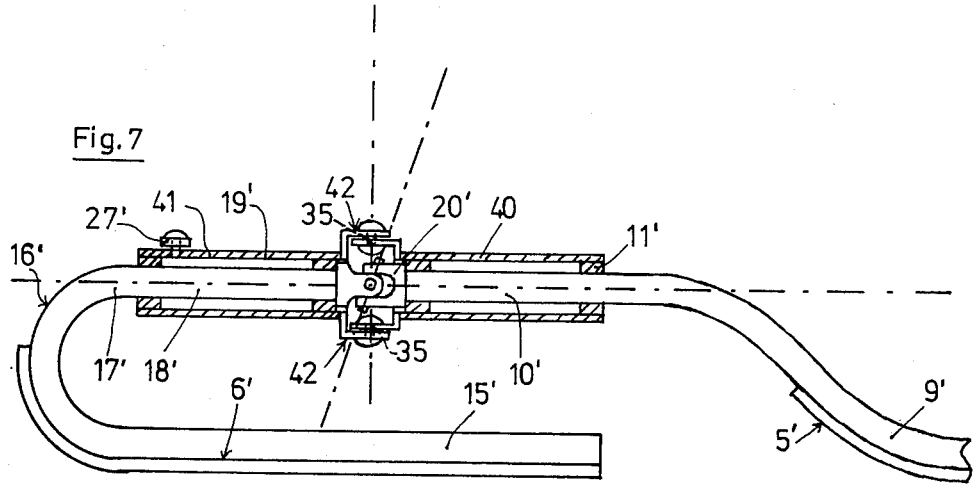

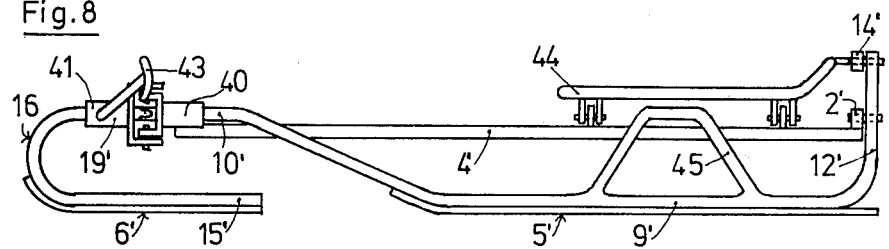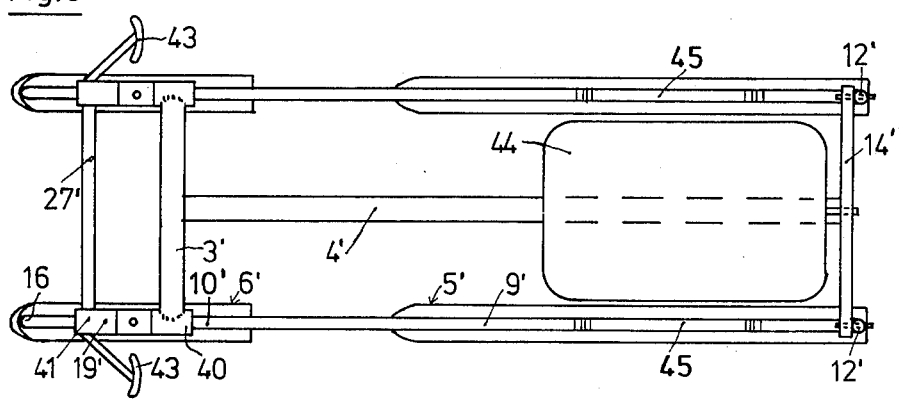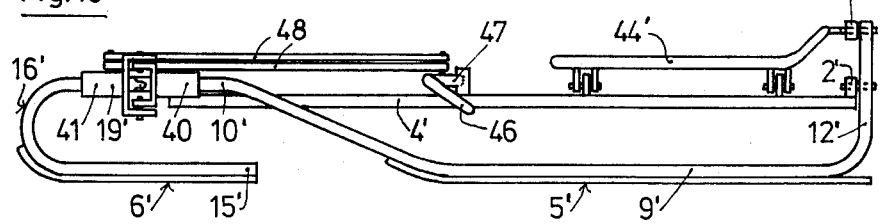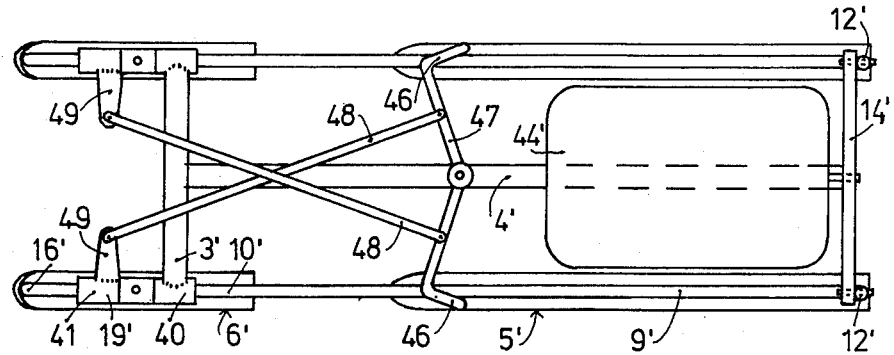

TILTABLE SLED

BACKGROUND OF THE INVENTION

Equipment for the purpose of tilting, or canting, of the seat and runners on sleds is known. It consists, as a rule, of parallelogram-like connecting elements which are linked to each other in a jointed fashion. Also, the equipment for the steering of such sleds is already known (cf. German Pat. documents Nos. 551,913, 629,828, 282,397 and DT-OS 1 813 578).

However, sleds with tiltable and steerable runners have previously not been widespread. One reason is most likely that these sleds are fitted out with numerous levers and joints and are therefore too costly for normal use. The main reason, however, may be seen to be that, for sleds with tiltable pairs of runners, no perfectly functioning steering mechanism has previously been developed. On the known sleds, either the steering is dependent upon the tilt of the runners or the steering is impaired with the increasing cant of the runners. For example, the effectiveness of the steering is reduced with the increasing cant of the runners.

SUMMARY OF THE INVENTION

The basic objective of the subject invention is to create a sled which, in contrast to the known tiltable sleds, is simply structured and in which, in spite of everything, the steering and canting can be carried out independent of each other, without their hindering each other.

This objective was met according to the invention, in that each front runner is mounted in a tiltable fashion in a steering element connected with the sled frame, which, for the steering motion, is swivel-mounted relative to the sled frame around each steering axle which is standing primarily perpendicular to the surface of the sled. The steering element intersects with this steering axle, the tilting axle of the corresponding front runner, the tilting axle of the corresponding rear runner and the joint axles of a cardanic joint, which connects the front runner to the corresponding rear runner for the transferral of the tilting motion intersect. If the cardanic joint is a universal joint, then at least four axles intersect with the steering with the steering axle, around which the individual parts of the steering equipment are turnable or swivelling. The cardanic joint can also be a flexible shaft for the transfer of torsional force.

By this arrangement, any desired swivel or tilting motion of the rear runners is transferred directly to the front runners, without the steerability of the front runners being impaired. Besides this, by such a suspension of the front runners, they are prevented from pressing into the ground with their tips during severe steering impact and tilting. Moreover, the front runners can be kept on a common surface level with the rear ones at any steering or tilting position.

With such sleds, the moment of tilt which is experienced during fast and/or narrow curving runs and travel along slopes can be neutralized. The maneuverability vis a vis the usual simple tobaggan is improved.

Also, with any form of execution of this invention, a slight canting of the front runners, which is independent of the canting of the rear runners can be achieved thusly: the jointed axle of the cardanic joint which normally, in the non-tilted position of the sled, is vertical in the steering axle of the sled, is so arranged that it runs with a slight inclination diagonally from above and behind to below and in front. With increasing steering impact, the front runners are increasingly canted, which, especially on an iced track, leads to an increase in the gripping power of the front runners.

The connection joint between the steering element and the sled frame, which lies in the steering axle can be arranged above or below the cardanic joint. Preferably, it is designed as a double joint situated in the steering axle, which encloses the cardanic joint. The steering elements are preferably designed as steering levers which possess at least one bearing for the front runner. To advantage, the steering elements can be designed as steering cases, which surround the bearing-mounted parts of the front runner. In order to protect the joint connection against some sort of over-loading, the sled frame, for example in the form of a curved support, can rise toward the front to above the steering element, so that if it happens, the steering elements which are equipped with rollers or the parts of the front runners resting in there, can roll away on the underside of the sled frame.

For the guidance of the front runners in the given direction they are preferably bound to each other directly, by a jointed tract rod situated on the front runners. To good advantage, the steering levers of the front runner can be connected also over rods or on a means of connection working in tandem with a steering control lever situated on the sled frame, which brings about the steering of the front runners as well as the direction of same. Such steering rod linkages are, as a rule, driven in parallelogram fashion in connection with the pivotal and steering axles of the steering mechanism. By a trapezoid-shaped arrangement and direction of this rod-linkage one can see to it that the front runners deviate a little from the parallel alignment with increasing impact in the steering so that one front runner has a somewhat stronger steering impact than the other.

The sled, according to the invention, has a seat, which is preferably inclinable to the side according to the cant of the runners. For guidance in the same direction, especially for the parallel direction of the canting of the runners on each side of the sled, the rear runners can, preferably by a jointed-trapezoid or jointed-parallelogram, be bound with each other. To advantage, the seat can be connected in swivel fashion with the sled frame around the axle parallel to the sled's long axis. Thus, the transferral of the canting motion from the rear runners to the seat or vice versa can be brought about by a connection between the seat and the jointed-parallelogram connecting the rear runners and the like.

For the steering of the sled, it can be fitted out with the customary steering equipment, which has a steering wheel, a steering column and transferral components for the transfer of the steering motion to the front steering elements. Preferably, the steering column and steering wheel are also constructed so that they can be maneuvered to the side in accordance with the cant of the runners. With this, the steering column can be put into a support firmly bound with the seat and at the point of intersection with the pivot axle of the seat it can have a cardanic joint, so that the steering motion can be carried out independently of the sideways pivoting of the steering columm.

In a particularly favored embodiment of the invention, the sled is shaped in a flat form. The seat extends above the sled frame either slightly or not at all. The steering mechanism is constructed mostly at the level of the sled frame parallel to the sled's contact surface.

Advantageously, the sled frame is built mostly in the shape of a double T, with a lengthwise middle support and a front and rear crosswise support. The outer ends of the front and rear cross supports can each have a bearing situated on the canting axis of the rear runners for the rear runners. The jointed connection which lies in the steering axle can be connected to the front steering element on the front side of the support which is fastened to the front cross support.

In the embodiment of the invention in which the seat is connected to the rear runners for the purpose of transferring the canting motion, the canting motion can be undertaken in the seat by shifting of the weight. It is possible, however, to develop special tilting mechanisms to ease the tilting of the sled during a given curve or pitched-slope run.

The seat is situated on the sled, as a rule, so that it can pivot around an axle which runs along the underside of the seat. Retraction springs can be provided between the seat and the sled frame, which work counter to the sideways tilting motion of the seat and return the seat to its middle position when there is an equal distribution of weight. In order to diminish the moment of tilt of the seat, the seat can be situated on the sled frame which is also on the pivot-axle that runs above the seat surface.

Further still, if preferred, hand grips are provided for the sled, which enable the driver to hold on and in addition, at the same time, they can be connected with the steering mechanism of the sled or with a mechanism for restraining the canting of the runners. Thus, two-armed levers with hand grips on their outer ends can be provided, arranged in the normal position diagonal to the direction of travel, which can be pivoted around an axis in a plane perpendicular to the sled support. Preferably, these two-armed control levers are able to pivot in a single plane which is usually the same as the plane of the sitting surface of the seat. Also, bracing equipment for the feet can be provided, on the sled frame itself, as well as on pivotable control mechanisms for the steering or for the canting. Thus, on one version of the invention foot pedals are provided on the steering elements, which extend toward the outside on the sides. By means of their action, the sled can be steered in a simple manner. Corresponding pedals or foot braces can also be provided on the ends of two-armed levers as they were described above, so that the steering or the tilting can be carried out by the foot control of such levers.

According to the invention, it is also possible to provide in addition to, or instead of, the rear runners, motor-driven caterpillar drives. Thus, in a favored version of the invention a caterpillar drive, between the rear runners, is provided which can be adjusted up and which can be put into operation during the sled's travel on level ground or when going up a mountain. Further characteristics of the invention will be seen from the following descriptions of the versions in connection with the drawing and the claims.

BRIEF DESCRIPTIONS OF THE DRAWINGS

In the drawing:

FIG. 1 shows a top view of an embodiment of the invention in which the seat is merely indicated;

FIG. 2, a rear view of the embodiment in FIG. 1 in the normal position;

FIG. 3, a rear view of the embodiment in FIG. 1 in an inclined position, corresponding to a curving run;

FIG. 4, a front view of the embodiment in FIG. 1 in an inclined position, corresponding to a pitched-slope run;

FIG. 5, a side view of the embodiment in FIG. 1;

FIG. 6, a longitudinal section along the line VI—VI in FIG. 1;

FIG. 7, a section through the front joint-connection between the front and rear runners of another embodiment of the invention;

FIG. 8, a side view of an additional embodiment in accordance with the invention;

FIG. 9, a top view of the embodiment in FIG. 8;

FIG. 10, a side view of an additional embodiment of the invention;

FIG. 11, a top view of the embodiment in FIG. 10;

FIG. 12, a cross-section of an additional embodiment in accordance with the invention along the line XII—XII in FIG. 13;

FIG. 13, a partial top view of the embodiment in FIG. 12;

FIG. 14, a partial view of an additional embodiment;

FIG. 15, a top view of the embodiment in FIG. 14;

FIG. 16, a partial view of an additional embodiment; and

FIG. 17, a top view of the embodiment in FIG. 16.

DETAILED DESCRIPTION

Figure 12:
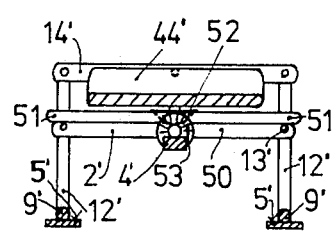

The first embodiment of the invention shown in FIGS. 1-6 has a sled frame 1, which is essentially constructed of a rear cross brace 2, a front cross brace 3, and a longitudinal brace 4, which runs lengthwise along the middle of the sled and connects both cross braces 2 and 3. On the sled frame 1 are situated two rear runners 5 and two front runners 6 which are tiltable around canting axes which run in the direction of travel. In addition, the sled has a steering mechanism 7 and a seat 8.

The bearing surface of the two runners 5 is identical. The rear runners 5 have running surfaces in the form of skis, which are fastened onto the underside of a tube 9 which runs in a lengthwise direction. This tube 9 is S-shaped rising upwards at its front end and is bent forward and it proceeds into a shaft 10 which runs co-axially to the canting axis. This shaft 10 is pivotably situated in a bearing 11, which is fastened laterally to the front cross-brace 3. On its rear end, the tube 9 has a neck which runs perpendicularly upward with respect to the outer surface of the rear runner. This neck 12 is pivotable, in its top part, around an axle 13, fastened laterally to the rear cross-brace 2 and connected in a jointed fashion at its top end, which extends above it, with a cross-rod, which forms a jointed-parallelogram with the rear cross-brace 2, and connects the two necks 12 of the rear runners 5 with each other. The front shaft 10 of the tube 9 and the rear axle 13 each line on a common axis line, that is the axis of the canting axle which runs in the direction of travel. The runner 5 is kept axially immovable in the sled frame. By means of the jointed-parallelogram at the rear end of the sled, which is arranged perpendicularly to the sled surface, the two rear runners are connected with each other in such a way, that they are always, in any canting position, positioned parallel to each other. By means of this, an equally adjusted parallel inclination or cant of the rear runners 5 is obtained.

The suspensions of both front runners 6 are also identical. The front runners have a bent U-shaped tube, whose bent middle piece runs in the direction of travel.

On the lower neck 15 of the U-shaped tube 16 a ski-shaped running surface is fastened. The upper neck 17 of the tube 16 runs parallel to the lower neck 15 and is mounted as a shaft 18 of a steering element, which has been constructed as a steering lever 19, and which has been pivotably connected with the front end of the sled frame 1. The steering lever 19 is connected pivotably with the front cross-brace 3 around a steering axle which is perpendicular with respect to the sled-contact-surface of the sled. The shaft 18 is further connected at its back end with the shaft 10 of the rear runner tube 9 by means of a cardanic joint 20. The cardanic joint 20 is so arranged that its pivotal point lies in the axis line of the steering axle 35, respectively the axles of the cardanic joint intersect with the steering axle. Also, the canting axles of the shafts 10 and 18, respectively of the front and rear runners intersect with the steering axle 35. When running straight ahead, the canting axles of the front and rear runners, which have been coordinated with each other, coincide.

By means of the connection which has been described of the front runners 6 with the rear runners 5, by a cardanic joint 20, any desired cant of the rear runner 5 or its shaft 10 can be transferred to the front runner 6 or its shaft 18, totally independent of whether the front runners 6 are steered straight ahead or to the right or left. The other way around, the front runners 6 can be steered, completely uninfluenced by their tilt or cant, in parallel with each other, straight ahead, to the right or left, wherein they always move in the level of the sled-contact-surface.

The cardanic joint 20 has, preferably, on the front half of the joint 21 a joint pin 22, which is horizontal when the runners are not canted, and also has an essentially vertical joint pin 24 on the rear joint half 23. So the joint pin 24, which can be arranged on the half of the cardanic joint coupling 23 which is linked to the rear runner shaft 10, slants a little of the perpendicular with respect to the running surface of the rear runner 5, so that the lower end of the joint pin 24 comes to be in front and the upper end of the pin is behind the pivotal point of the cardanic joint 20. This arrangement causes the front runners 6, after steering to the right or left to experience a slight cant, independent of the rear runners 5, which increases the effectiveness of the steering. Thereby, the cant increases with increasing steering deflection. On the front end of the shaft 18, a freely turnable roller 25 is preferably arranged, which supporting the U-shaped tube 16 and the front runner 6 linked to it, rolls on the underside of a front support framework 26 which is rigidly connected with the front cross-brace 3, and together with the roller 25 makes possible stress relief for the joint between steering levers 19 and the sled frame 1.

The lateral steering levers 19 are connected with each other in a jointed fashion by means of a track rod 27. In the center of this track rod, a middle steering lever 28 is fixed which, on the sled frame 1, is mounted pivotably around an axis, which is perpendicular which respect to the sled surface. The steering lever 28 is connected in the axial line of this axis over a universal joint 29, which works like a cardanic joint, with a steering column 30. This steering column transfers the turning motion of the steering wheel 31 to the middle steering level 28. The steering column 30 is mounted on a support 32 in the seat 8, so that it can be turned and with this support 32 together with the set 8 pivots about a pivotal axis, which runs parallel to the longitudinal axis or axle of the sled, (and is) laterally inclinable. For this the seat 8 is mounted on the longitudinal brace 4 of the sled frame 1 in seat supports 33 and 34, which lie in the middle axis parallel to the sled's longitudinal axis or axle.

At its back end, the seat 8 is connected in a jointed fashion with the cross rod 14 of the rear jointed-parallelogram. By means of this arrangement, the steering wheel 31 and the steering column 30 are connected above the seat 8 and the jointed-parallelogram 2, 12, 14 with the runners 5 and 6, so that a lateral pivoting of the steering wheel and the seat 8 brings about an equally adjusted tilt or cant of the runners 5 and 6 and vice versa.

In addition, by means of the presented arrangement of the steering mechanism 7, any desired turning motion of the steering wheel 31 can be transferred to the steering parallelogram and the front runners 6 by way of the steering column 30, the cardanic joint 29 and the middle steering lever 28, without being hindered by the pivoting motion of the steering column 30 around the sled's longitudinal axis or axle. Since the canting motion of the rear runners 5 is transferred by the cardanic joint 20 to the front runners 6, only the rear runners 5 have to be connected with each other for the purpose of the transferral of the canting motion.

The sled according to the invention can be provided with a caterpillar drive and a motor (not shown in the drawing). Then, the front and/or rear runners, preferably the rear runners, can be replaced with caterpillar drives. In one embodiment of the invention, a caterpillar drive, which can be raised, is provided between the rear runners or even behind the sled frame itself. This caterpillar drive can be raised during a run, so that it does not come in contact with the ground.

In the version as in FIGS. 8–17, the shafts 10' of the rear runners 5' and the shafts 18' of the front runners 6' in the area of the cardanic joint 20' which connects them to each other, are mounted in the bearing sleeves 40 and 41 so that they are cantable and axially rigid. This bearing arrangement is presented in detail in FIG. 7. The bearing sleeves 40 are firmly connected with the front cross-brace 3' of the sled frame 1'. The front bearing sleeves 41, which make up the steering levers 19' are connected in a jointed fashion with the bearing sleeves 40 in the steering axle 35, which is perpendicular to the sled-contact-surface. Indeed they are connected by joint connections 42, arranged one above and one below the cardanic joint 20'.

Since this double joint connection is more stable than the corresponding joint connection of the previous embodiment, the front support framework 26 and the roller 25 can be dispensed with. Furthermore, the embodiments as in the FIGS. 8–17 have in common the characteristic that they operate without a steering column and a steering wheel. They are built flatly and have a low seat, which extends above the sled frame either slightly or not at all. The mechanisms which provide for steering and canting are essentially arranged on the level of the sled frame. Also, the jointed-parallelogram which connects the two rear runners is constructed so that it can be separated, and the seat is preferably removable, so that the whole sled can be taken apart or is collapsible for the purpose of transport. In the version in FIGS. 8 and 9, the front steering levers 19' have lateral steering pedals 43 which extend outward and which are rigidly connected with the steering levers. A front cross-rod or track rod 27' takes care of the parallel direction of the front runners 6'. The canting of the runners 5', 6' is accomplished by means of the displacement of weight on the seat 44, which is connected in a jointed fashion on its underside with the longitudinal brace 4' and on its back side with the upper cross rod 14' of the rear jointed-parallelogram. A holding grip 45 on the top side of each of the rear runners 5' in reach of the seat 44 provides a sure grip for the driver and serves also for the support of the displacement of weight with respect to the canting of the sled.

In the version in the FIGS. 10 and 11, the seat 44' is constructed as in the previous version. Also, the common pivoting of the seat 44' and runners 5' and 6' is accomplished in the same way as in the previous version. Merely the handgrips 45 are lacking, because here special grip handles for the manipulation of the steering are provided. For the steering of the sled a two-armed control lever 47 is provided on the longitudinal brace 4' between the seat 44' and the front cross-brace 3', which is pivotable around an axle which is perpendicular to the sled-contact-surface. The control lever 47 has handgrips on its outside ends. The length of the control lever 47 corresponds essentially to the width of the sled. The lever 47 is connected by way of connection rods 48, which cross over each other, with the lever-bases 49 (of the steering lever 19') which extend laterally inward. With this, the connection lines between the pivot point of the control lever 47 and the pivot point of the lateral steering lever 19' and the pivot points of the corresponding connection rods 48 form in each case a steering parallelogram or steering trapezoid. By means of this arrangement the driver, by pivoting the control lever 47 can, with his hands, steer as well as influence by means of supporting on the hand grips 46 the displacement of weight on the seat and therefore also influence the canting of the runners.

With this arrangement, the feet are free for other manipulations, as for example, for braking or for the control of a motor in case a caterpillar with a motor drive is provided. In the simple versions, braking can be accomplished directly by putting the feet on the ground. However, special braking mechanisms can also be provided. A special advantage of the version as presented in FIGS. 10 and 11 is still to be seen in that the handgrips 46 can also be used as handles for the carrying of the sled, when the sled is collapsed.

The version in the FIGS. 12 - 17 shows further canting mechanisms for seat and runners.

The two versions shown in the FIGS. 12 - 15 each have a double-armed pivot lever 50, which is mounted pivotably around an axle which is perpendicular to the longitudinal sled axle or axis and the seat surface. On its free ends, the pivot lever 15 has handgrips 51. In the version shown in FIGS. 12 and 13, the pivot lever 50 has, on its pivot axle, a bevel gear 52, which can be turned on a second bevel gear 53. The second bevel gear 53 is fastened rigidly to the sled's longitudinal brace 4'. During pivoting of the pivot lever 50 in one or the other direction, the pivot lever 50, together with the seat 44' is pivoted out of the plane which is parallel to the plane of the sled surface toward one or the other side, around the pivot axle of the seat; this is caused by the mutual turning of the bevel gears 52 and 53. During the turning, this pivoting motion is transferred by way of the jointed-parallelogram to the runners and it thereby brings about a canting of the runners.

Figure 13:
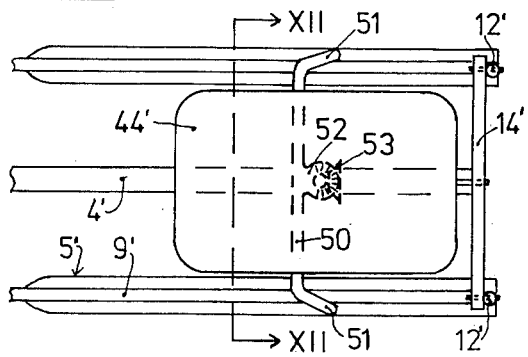
Figure 14:
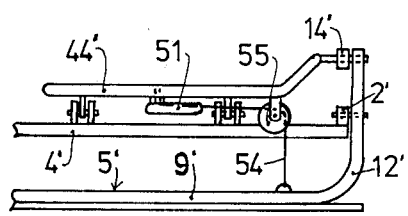
Figure 15:
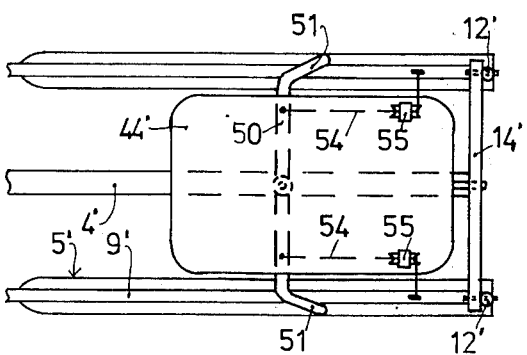

In the version shown in FIGS. 14 and 15, the pivot lever 50 is directly connected with the rear runners 5' by means of a pulley, preferably a rope pulley 54. The pulley means 54 are preferably passed over a direction changing means 55, for example, rollers, which are arranged on the seat 44'. The pivot lever 50 in the version in FIGS. 12-15 is fastened in a jointed fashion not on the sled frame, but on the underside of the seat 44'.

Figure 16:
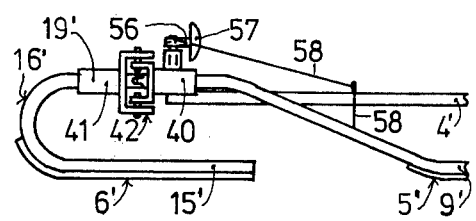
Figure 17:
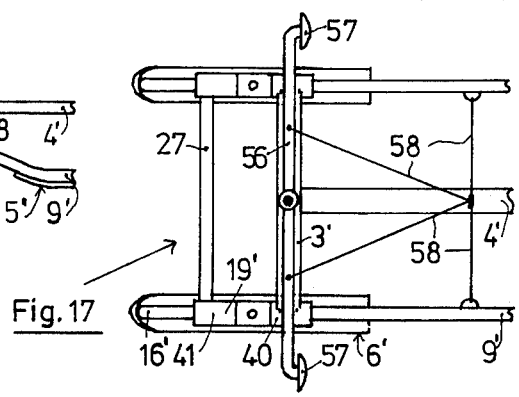

The version of the invention shown in FIGS. 16 and 17 also has a double-armed pivot lever 56, which is, however, on the other hand, mounted on the sled frame 1' itself pivotable around an axle which is perpendicular to the sled's longitudinal axis or axle. This pivot lever 56 is fastened in the forward area of the sled frame 1 on the front cross-brace 3', and has on its outer ends foot supports 57. The pivot lever 56 is, by way of the pulley means, for example, a pulley rope 58, connected with the rear runners 5, wherein they are passed over a direction changing mechanism, which is provided on the longitudinal brace 4'. The pulley ropes 58 can, in the version shown, either cross over each other or be guided past each other, depending on whether a direction of manipulation of the lever 56 is to accomplish a cant of the sled to one side or to the other.

In the version of the invention shown in FIGS. 12 and 13, the transferral of the canting motion from the seat is accomplished by way of the jointed-parallelogram to the rear runners 5'. In the embodiment in the FIGS. 14 and 15, the canting motion is transferred from the control lever 50 by way of the pulley rope, which has been turned at the seat, directly to the rear runners 5'. With this, the lateral inclination of the seat and the canting of the runners are coordinated by means of the rear jointed-parallelogram. In this embodiment, it is, however, also possible to connect the seat rigidly to the sled frame, so that it does not participate in the canting motion. The connection between the seat and the jointed-parallelogram is thereby removed. Also in the embodiments in FIGS. 16 and 17, a canting of the runners is possible without moving the seat. Also here the canting motion is transferred directly from the double-armed pivot lever 56 to the runners 5'. This canting motion can in turn be transferred by way of the rear jointed-parallelogram to the seat. Provided that a lateral pivoting of the seat is not desired, the seat can also here be rigidly connected with the sled frame 1', in which case a flexible connection between the seat and the rear jointed-parallelogram is again not provided. However, it is preferred that at the same time, a common canting or pivoting of the seat and runners be made possible.

The sled according to the invention can also be fitted out with a spring suspension. Moreover, the spring elements are provided preferably between the runners and the supports. Also, the supports themselves can be elastic, for example, through a rubber buffer.

The present invention may be embodied in other specific forms without departing from the spirit or essential attributes thereof and, accordingly, reference should be made to the appended claims, rather than to the foregoing specification as indicating the scope of the invention.

I claim:

1. A sled including a sled-contact-surface comprising:
a sled frame having two front steerable runners and two rear runners which are tiltable around canting axes running in the direction of travel each lying essentially parallel above the sled-contact-surface, said runners being connected with each other by at least one jointed-parallelogram which transfers canting motion;

steering elements connected to said sled frame with each said front runner being situated tiltably in one of said steering elements;

steering axles positioned essentially perpendicular to said sled-contact-surface, each of said steering elements being pivotable about a corresponding steering axle for steering motion relative to said sled frame; and cardanic joints connecting each of said front runners with corresponding rear runners for the transferral of said canting motion with said steering axle being intersected by the canting axis of the corresponding front runners, the canting axis of the corresponding rear runners, and the joint axes of said corresponding cardanic joints.

2. A sled as in claim 1 wherein the canting axes which lie in the direction of travel of said front and rear runners are in a common plane in each position of the sled.

3. A sled as in claim 1 wherein the sled frame has the form of a double T with a longitudinal brace, a front cross brace, and a rear cross-brace.

4. A sled as in claim 3, wherein the rear runners have ends which are extended upwardly with which they are mounted in the cross-braces.

5. A sled as in claim 4 wherein the rear runners are, at their front portions bent up going forward in an S-shape and proceed on into shafts which lie in the corresponding axis.

6. A sled as in claim 4 wherein the rear runners at their back portion have a neck, which runs upward, with which they are mounted on the rear cross-brace and a part of the neck which is extended upward above the sled frame forms, with a cross-rod, and the rear cross-brace (2), the jointed parallelogram.

7. A sled as in claim 1 further including a seat which is mounted pivotably on a middle axis parallel to the sled's longitudinal axis of the sled frame (1) and is connected by its rear end to the rear runners by way of the jointed-parallelogram for the purpose of common canting or pivoting.

8. A sled as in claim 7 further including a steering wheel having a steering column constructed to be laterally pivotable and is connected, by way of a cardanic joint, with the steering elements of the front runners.

9. A sled as in claim 1 wherein the jointed-parallelogram is constructed so that it can be dismantled for the purpose of collapsing the sled for transport purposes.

10. A sled as in claim 1 wherein each steering element for the front runners is constructed as a steering lever, which is linked on a front bearing for the back runners.

11. A sled as in claim 10 further including steering arms which are preferably constructed as foot pedals rigidly fastened laterally to the steering elements by which the steering power is to be transferred for the steering of the front runners.

12. A sled as in claim 10, further including a two-armed control lever pivotable around an axle perpendicular to the sled's contact surface, said control lever being connected with the steering elements by way of transfer elements, which preferably transfer pulling power.

13. A sled as in claim 7 wherein above the seat, a pivotable, two-armed control lever is mounted around an axle which is perpendicular to the seat surface, said control lever being connected with the steering elements by way of transfer elements, which preferably transfer pulling power.

14. A sled as in claim 1 wherein the forward portion of each of the front runners is bent up and backwards and are mounted by an upper neck into the corresponding steering element.

15. A sled as in claim 1 wherein parts of the front and rear runners, which are connected to the cardanic joint are constructed as shaft pieces, which are mounted in the steering element.

16. A sled as in claim 1 wherein the two steering elements of the front runners are connected with each other by way of a cross-connection rod for the purpose of common steering.

17. A sled as in claim 1 wherein the rear runners are tiltable by means of a lateral pivoting of a seat.

18. A sled as in claim 17 wherein the seat is mounted on the sled frame and is laterally pivotable by shifting of the weight of the driver.

19. A sled as in claim 18 wherein the rear runners are tiltable by a pulley means working between the seat and the rear runners.

20. A sled as in claim 19 wherein for the purpose of canting the runners a two-armed lever is mounted on the seat pivotable around an axle which is perpendicular to the seat surface, said lever being connected to the runners by means of transfer means.

21. A sled as in claim 20 wherein the control- or pivot-lever has a bevel gear on its pivot axle, with which the lever is able to be turned by a second bevel gear which is affixed to the longitudinal brace of said sled for the purpose of the lateral tilting motion of the seat.

22. A sled as in claim 1 wherein the rear runners are tiltable by a pulley means working between the sled frame and the rear runners.

23. A sled as in claim 1 wherein a two-armed lever is mounted pivotable around an axle which is perpendicular to the sled's contact surface for the canting of the runners, said lever being connected with the rear runners by way of transfer members.

24. A sled including a sled-contact-surface comprising:

a sled frame having two front steerable runners and two rear runners, said runners being connected with each other by at least one jointed-parallelogram which transfers canting motion;

steering elements connected to said sled frame with each said front runner being situated tiltably in one of said steering elements;

steering axles positioned essentially perpendicular to said sled-contact-surface, each of said steering elements being pivotable about a corresponding steering axle for steering motion relative to said sled frame; and joints connecting each of said front runners with corresponding rear runners for the transferral of said canting motion with said steering axle being intersected by the joint axes of said corresponding joints.

* * * * *